United States Patent [19]

Gunn

[11] 3,970,482
[45] July 20, 1976

[54] SIMPLIFIED METAL TREATING COMPOSITIONS FORMED FROM PRECURSOR COMPONENTS

[75] Inventor: Walter H. Gunn, Painesville, Ohio

[73] Assignee: Diamond Shamrock Corporation, Cleveland, Ohio

[22] Filed: Sept. 9, 1974

[21] Appl. No.: 504,383

Related U.S. Application Data

[63] Continuation-in-part of Ser. No. 298,646, Oct. 18, 1972, abandoned.

[52] U.S. Cl. .............................. 148/6.2; 148/6.16; 106/1; 106/14
[51] Int. Cl.² ........................................... C23F 7/26
[58] Field of Search ............... 148/6.2, 6.16; 106/1, 106/14

[56] References Cited
UNITED STATES PATENTS

| | | | |
|---|---|---|---|
| 3,350,285 | 10/1967 | Nishigaki et al. | 148/6.2 |
| 3,428,464 | 2/1969 | Pollard | 106/209 |
| 3,553,034 | 1/1971 | Harvey et al. | 148/6.2 |
| 3,659,026 | 4/1972 | Schuppner | 424/361 |
| 3,671,331 | 6/1972 | Malkin et al. | 148/6.2 |
| 3,682,718 | 8/1972 | Palm et al. | 148/6.2 |
| 3,687,739 | 8/1972 | Kennedy et al. | 148/6.2 |
| 3,718,509 | 2/1973 | Germano | 148/6.2 |

*Primary Examiner*—Ralph S. Kendall
*Assistant Examiner*—Charles R. Wolfe, Jr.
*Attorney, Agent, or Firm*—John J. Freer

[57] ABSTRACT

Metal treating compositions, formulated from precursor components, and containing chromic acid with pulverulent zinc and thereby finding particular utility in coating metal substrates prior to painting, can now have simplified precursor components. Such simplified precursor components may be easily and readily blended to form the metal treating composition. Yet such precursor components exhibit enhanced storage stability as well as compositional simplicity.

10 Claims, No Drawings

SIMPLIFIED METAL TREATING COMPOSITIONS FORMED FROM PRECURSOR COMPONENTS

CROSS REFERENCE TO RELATED APPLICATION

This application is a continuation-in-part of U.S. patent application, Ser. No. 298,646, filed Oct. 18, 1972, and now abandoned.

BACKGROUND OF THE INVENTION

In the great variety of coating compositions that contain chromic acid or its equivalents, it has been known that it may be desirable to modify or control the pH of the coating composition. For example, in U.S. Pat. No. 3,630,789 a treating solution for metal substrates containing chromic acid is formulated with careful control of the treating solution pH. Such pH should be about 1.8–5 to prevent the reaction of composition ingredients before application, while maintaining a solution bath that will effectively treat base metals.

In the variety of chrome-containing coating compositions, some have been referred to as bonding compositions, as in U.S. Pat. No. 3,382,081. It occasionally has been found desirable in these bonding compositions containing chromic acid along with a reducing agent for the chromium, or in compositions containing chrome in reduced form, to regulate the resulting coating bath pH during the coating operation. Such regulation will typically maintain the bath at a pH of about 3 or above. In U.S. Pat. No. 2,911,332 a bath of chromic acid and reducing agent is shown. When such is used in coating tin-plated steel, it has been taught to be helpful for the bath pH to be in the 3 to 10 range. In U.S. Pat. No. 3,553,034 the chromic acid in the bath is partly reduced to prepare a passivating solution for treating zinc. This solution is taught to be more effective during the treating process if the bath pH is maintained within the range of from 2.8 to 3.8.

One development in chrome-containing compositions includes formulation with pulverulent metal, especially pulverulent zinc. Thus, U.S. Pat. No. 3,671,331 discloses employing finely divided zinc most particularly in bonding coatings, i.e., compositions containing hexavalent chromium providing substance, such as chromic acid, and an agent for reducing the hexavalent chromium provided by the chromic acid. Further, U.S. Pat. No. 3,697,738 discloses the development of a coating composition that may contain, as principal ingredients, pulverulent zinc plus chromic acid.

These ingredients when present at the point of use of the resulting coating composition, may be readily blended together to prepare the composition for such use. However, it is not unusual to prepare the composition for subsequent storage, or for shipment before use. In such case, to prevent deleterious reaction or gelation of composition constituents during storage and/or shipment, it has been necessary to pre-package the coating composition ingredients in separate components. One of these components contains the finely divided metal; an additional component contains typically chromic acid or its equivalent and may further contain reducing agent for the hexavalent chromium. A third package is usually provided that contains one or more agents such as thickening agents, dispersing agents or suspending agents that will provide a final blended coating formulation of augmented stability and uniformity.

SUMMARY OF THE INVENTION

It has now been found that coating composition components of simplified nature can be prepared, for example, before storage or shipping. More particularly, a precursor constituent can now be formulated which may be readily and easily blended subsequently with pulverulent zinc to provide a desirable coating composition, and a resulting coating exhibiting excellent coating characteristics. Such precursor constituent displays augmented storage stability; further, coatings from compositions obtained with such precursor constituents will retain, or even show enhanced, coating characteristics and extended bath stability can be achieved with the coating compositions, including enhanced freedom from composition gelation.

Such precursor component simplicity is achieved through careful pH control of the precursor constituent that contains the chromic acid for the hexavalent chromium provided by the chromic acid. Resulting coatings from subsequent coating compositions, may afford enhanced adhesion to topcoats, as when subjected to shear force. Such force may be typically met when coated metal work pieces proceed through continuous metal forming operations such as encountered in the automotive industry, and initiated by drawing or pressing and continuing on through a series of trimming, punching and bending steps.

In one aspect, the present invention is directed to the method of preparing a pulverulent-zinc-containing coating composition, having enhanced compositional stability at a pH below about 5.6 and above about 4.5, which composition is adapted for treating metal substrates and providing corrosion resistance thereto. The coating composition is prepared to contain hexavalent chromium from a pulverulent-zinc-free chromic acid component (A), and to further contain zinc from a pulverulent zinc component (B). The method comprises first preparing the chromic acid component (A) at a pH of from 3 to below about 5 and with reduced forms of chromium, if such exist, being substantially below 5 percent of the component hexavalent chromium. This preparation of the chromic acid component (A) includes: (a) establishing an aqueous composition containing chromic acid in solution, the chromic acid being present in amount sufficient to provide for a pH in water of below 3.0, then, (b) adjusting the pH of the aqueous composition to from 3 to about 5, inclusive, with basic, compatible and acid soluble pH adjustment agent, wherein compatability of the pH adjustment agent provides cured coatings from the coating composition of enhanced water insolubility; and next, (c) admixing xanthan gum hydrophilic colloid to the composition of adjusted pH and after the pH adjustment, for preparing the chromic acid component (A).

The method of preparing the coating composition is continued by preparing the pulverulent zinc component (B) to contain zinc in an amount sufficient to supply above about 50 grams per liter of pulverulent zinc to the coating composition; and then blending components together to prepare the coating composition of enhanced stability.

The present invention is also directed to a pre-paint coating composition precursor constituent of simplified nature and augmented storage stability as well as to its preparation. The invention is further directed to coated metal substrates as well as to such substrates that are further topcoated, and is also directed to coated metal articles thereby produced.

DESCRIPTION OF THE PREFERRED EMBODIMENTS

The precursor constituent, or "chromic acid component", for preparing the pre-paint coating composition has as a key ingredient the chromic acid. This supplies hexavalent chromium to the precursor constituent and it may also be supplied to the constituent by equivalents to chromic acid, for example, chromium trioxide or chromic acid anhydride. Although the chromic acid may be present in the precursor constituent in small amount, for example at a concentration equivalent to 10 grams of $CrO_3$ per liter, the chromic acid may be present in very substantially greater amounts, for example 80–100 grams of $CrO_3$ per liter of water. It is most typical to formulate a precursor composition, regardless of whether such constituent will be used at the point of formulation, or will be formulated and shipped prior to use, that contains chromic acid in a concentration equivalent to between about 20–40 grams per liter. For a coating composition that would contain the key ingredients of chromic acid and pulverulent zinc, such as taught in U.S. Pat. No. 3,687,738, the simplistic precursor constituent could be free from agents for reducing the hexavalent chromium provided by the chromic acid. Otherwise, such constituent will generaly further contain some reducing agent as a principal ingredient.

In the prior art a very extensive number of substances have been shown to be capable of reducing hexavalent chromium; they are therefore taught to be useful in pre-paint coating compositions containing chromic acid and a reducing agent therefore. It is however contemplated that the reducing agent or combination of reducing agents present in the precursor constituent be water soluble in major amounts and yet provide a subsequent pre-paint coating on a metal substrate that is water insoluble. Further, it is preferred for efficiency in the preparation and use of the precursor constituent that the reducing agent be completely water soluble.

It is further necessary for the reducing agent to exhibit suppressed action, or no reducing action towards the hexavalent chromium during formulation of the precursor constituent. If reduced forms of chromium exist, i.e., if chrome is present in a valence state lower than hexavalent, such should provide substantially below 5 percent and preferably below one percent, of the hexavalent chromium of the chromic acid component. Also, although not a consideration when the chromic acid is present in the constituent in substantial amount, e.g., at a concentration equivalent to above about 20 grams per liter, when greater than about 20 grams of chromic acid per liter are present, the mole ratio of the $CrO_3$ to the reducing agent is generally on the order of 4 to 1 but may be greater. However, this ratio may be less, for example 0.8:1.

Although the use of any of a variety of reducing agents is contemplated, it is preferred for efficiency and economy to use the acidic reducing agents. Most especially these are succinic acid or the other $C_5$–$C_{14}$ dicarboxylic acids as have been disclosed in U.S. Pat. No. 3,382,081. Such acids with the exception of succinic acid may be used alone, or these acids can be used in mixture or in mixture with other organic substances exemplified by aspartic acid, acrylamide or succinimide. Additional useful combinations that are particularly contemplated are the combinations of mono-, tri- or polycarboxylic acids in combination with additional organic substances as has been taught in U.S. Pat. No. 3,519,501. Still further are the teachings in regard to reducing agents that may be acidic in nature and therefore especially useful in the present invention and have been disclosed in U.S. Pat. Nos. 3,535,166 and 3,535,167. These reducing agents will typically readily provide for solutions in water along with chromic acid that have a pH of below 3.0.

Substantially all of the pre-paint coating compositions, and thus substantially all of the precursor constituents, are simply water based ostensibly for economy. But for additional substances for supplying minor amounts of a liquid medium, there have been taught, as in U.S. Pat. No. 3,437,531, blends of chlorinated hydrocarbons and a tertiary alcohol including tertiary butyl alcohol as well as alcohols other than tertiary butyl alcohol. It would appear then in the selection of the liquid medium for the precursor constituent that economy is of major importance and thus such medium would most always contain readily commercially available liquids.

Another key component to the precursor constituent is the inorganic pH adjustment agent. Such agent should be basic, and by this it is meant that the agent will yield a solution pH above 7.0 when the agent is dissolved in distilled or deionized water. Also, such agent should have sufficient water solubility in the aqueous chromic acid solution of the precursor constituent, i,e., be acid soluble, so as to provide for the necessary pH adjustment. Compatibility of the agents, although it can include the foregoing characteristics, is also based upon the pH adjusting agent providing for final coatings, after application of the pre-paint coating composition to a metal substrate and curing, which subsequent coatings are water insoluble. An additional characteristic determining compatability of the agent is that it be essentially chemically inert towards the chromic acid, i.e., that it behave in solution in the precursor constituent in a manner to not deleteriously reduce the hexavalent chromium provided by the chromic acid. The reduction of the hexavalent chromium should thus be essentially or completely the function of the reducing agent. It is however contemplated to use compatible pH adjusting agents that may have minor effect in regard to reduction of the hexavalent chromium under very acidic conditions. For such use, there is initially used for pH adjustment an agent that will operate for initial adjustment of pH without commensurate, deleterious chromium reduction. Thus, initial adjustment might elevate the chromic acid component pH to a range of about 3–4, then a differing agent, more sensitive to acidic conditions concerning chromium reduction, may be used for final pH adjustment of the component without affecting chrome reduction.

Representative compatible pH adjusting agents are the inorganic metallic oxide, carbonate and hydroxide of lithium. The higher metals in Group 1A, i.e., sodium and potassium, can be initially adequate for pH adjustment. However, the subsequent coatings on metal substrates have been found to be water soluble and thus such agents are not suitable as compatible pH adjusting agents. Other metal oxides, carbonates and hydroxides that are however compatible can be supplied by metals in Group IIA, e.g., calcium oxide or calcium carbonate, or metals in groups above IIA, i.e., to the right of the IIA Group in the periodic table, such as zinc oxide as a representative of Group IIB. So long as such substances have compatibility, they are regarded as suitable pH adjusting agents. Although representative pH adjusting agents in addition to those already mentioned include calcium hydroxide, magnesium oxide, and strontium oxide, the above mentioned zinc oxide is especially preferred for efficiency.

The agent is blended into the precursor constituent to provide for an adjusted pH of the constituent within the range of from 3 to about 5, inclusive. The amount of agent actually used will of course depend upon the concentration of the chromic acid in the precursor constituent, and additionally, for example, on the concentration of reducing agent and on the neutralizing strength of the pH adjustment agent. It is most practicable to measure the precursor constituent pH during adjustment for considering the amount of pH adjustment agent to be added.

The other key ingredient for the precursor constituent is the xanthan gum hydrophilic colloid. Such substance, known commercially simply as "xanthan gum", which term may also be used herein for convenience, may also be termed a heteropolysaccharide, or carbohydrate, as they can be produced by the fermentation of a carbohydrate, for example by the bacterium *Xanthomonas campestris*. Such xanthan gum hydrophilic colloids are complex in nature and have high molecular weight, e.g., more than one million is typical. Such substance is generally available in powder form that exhibits ready solubility in water. The use of the xanthan gum hydrophilic colloid in water, even in very minor amounts, exhibits excellent suspending property. Thus, although greater amounts may be used a 1% solution of the xanthan gum hydrophilic colloid will support a 10 weight percent blend of a very finely divided silica sand for several days; this suspending power is ostensibly independent of suspension pH. The preparation of the xanthan gum hydrophilic colloids, and most particularly from the bacterium *Xanthomonas campestris*, has been extensively discussed, for example in U.S. Pat. No. 3,659,026, and solution characteristics in water for such hydrophilic colloid are also discussed in that patent.

It has been previously necessary in the preparation of pre-paint coating compositions containing xanthan gum hydrophilic colloid, and wherein precursor constituents are blended well in advance of formulating the coating composition, to separate the hydrophilic colloid from other components. Thus, as has been mentioned hereinbefore, it has been typical to formulate a precursor constituent containing chromic acid and reducing agent for the chromic acid. A separate package then contains pulverulent zinc; and, an additional component contains further agents including the xanthan gum hydrophilic colloid thickening agent. With the present invention, the pH adjustment of the precursor constituent to from 3 to about 5, now permits the direct preformulation blending of the xanthan gum hydrophilic colloid into the package containing the chromic acid. Other agents, e.g., anti-settling agents and dispersing or surface activating agents, may also be employed in this constituent. This results in a "two package" pre-formulated system with the one package containing pulverulent zinc and the other package having the adjusted pH and containing other compositional substances as detailed herein.

Prior to this, because of the susceptibility of the xanthan gum hydrophilic colloid solutions in water, over prolonged storage, to be subjected to bacterial action, it has been necessary to include in such solutions very minor amounts of suitable preservative. These include substances such as formaldehyde, and sodium pentachlorophenate. It has now been found in the present invention, that the chromic acid in the precursor constituent is such a sufficiently powerful preservative, even at the adjusted pH levels for the precursor, that the presence of additional preservative is unnecessary. Hence, the resulting coating compositions thereafter prepared are of a more simplistic nature.

The compatability of these xanthan gum hydrophilic colloids with additional gums results in useful blends that may also be used in the precursor constituent of the present invention so long as the xanthan gum forms the major amount, and advantageously contributes at least 60 weight percent to the blend of gums. For example, in the above mentioned U.S. Pat. No. 3,659,026, a particularly useful blend has been taught that includes the xanthan gum along with locust bean gum. Preferably, for economy and enhanced solution viscosity, such blends contain between about 60–95 weight percent of the xanthan gum. Additional gums which exhibit compatability with the xanthan gum include other natural gum thickeners such as guar gum, karaya gum and tragacanth gum that can be used in aqueous media for their thickening power. As has been mentioned hereinbefore, such precursor constituent may further contain additional agents, including wetting agents and suspending agents and the like. These agents may also be surface active agents, and those typically used may be hydroxyl-containing hydrocarbon ethers. These include the alkyl ethers of alkylene glycols, such as butyl ether of propylene glycol and the oxyalkyl ethers of alkylene glycols.

Upon formulation of the precursor constituent with its appropriate ingredients and appropriate pH, such is then ready for storage or shipment or for blending with additional pre-paint coating composition substances. These include the finely divided zinc which above, will have some oxide content. It is neither commercially feasible, nor practicable, to obtain finely divided zinc that has virtually no oxide content. The pulverulent zinc may contain oxide in as much as 12–15 weight percent oxide or more, basis total weight of the zinc. It is, however more typical that the zinc have an oxide content of less than 10 percent for example, 3–5 weight percent. So long as the precursor constituent is appropriately prepared in accordance with the present invention, the oxide content of the zinc can have this great variation and generally not form undesirable pre-paint coating compositions.

As will be recognized by those skilled in the art, the particulate zinc will contain very minor amounts of other ingredients. Exemplary of such other materials are about 0.2% or less of lead and iron and about 0.1 weight percent of cadmium. In pre-paint coating compositions of the prior art it has been contemplated to employ blends of pulverulent metals, as disclosed for example in U.S. Pat. No. 3,687,738. Thus it is contemplated in the present invention that the pulverulent zinc may actually be a pulverulent metallic blend, e.g., containing up to 20 weight percent or more of pulverulent aluminum with a balance of particulate zinc.

The zinc component should contain sufficient zinc to provide the coating composition with at least about 50 grams per liter of the pulverulent zinc. Following composition preparation, there should be sufficient of the chromium containing component to provide in the coating composition a weight ratio of chromium, expressed as $CrO_3$, to pulverulent metal of not substantially less than about 0.08:1. A ratio of less than this may not provide sufficient chromium in the subsequent coating to achieve augmented bonding of the pulverulent metal to the metal substrate.

On the other hand, a ratio of greater than about 0.4:1 may detract from the most enhanced corrosion resistance for the coated substrate. Thus, for an exemplary composition containing about 200 grams per liter of zinc, chromium should be supplied in an amount sufficient to provide in the coating composition an amount of chromium between about 15–80 grams per liter of coating composition.

When the coating composition is finally prepared upon the blending of the components, it is important that the resulting composition have a pH of less than about 5.6, but above about 4.5 for extended bath stability, e.g., suppressed composition gelation. As mentioned hereinabove, this control of composition pH must be arrived at during preparation of the chromic acid component. This achieves, for example, the most desirable characteristics in the applied coatings from the composition. The components, after preparation and without further operation, may well be harmonized in regard to their pH affect. In such case, coating composition pH and/or stability is sufficient to determine the pH affect of the components on the composition. Often however, attention is advisable to such pH affect when operating beyond typical parameters, e.g., when operating at substantially more than 200 grams per liter of zinc for the coating composition, and especially with a high oxide content zinc.

To then harmonize the pH affect of the components, the pH of the chromic acid component is directly determined. Also, the oxide content of the particulate zinc of the zinc component is determined. This oxide content determination may be done directly by standard method of determination, or such information is ostensibly always available from the manufacturer of the particulate zinc. The oxide content of the zinc, i.e., the suitability of the particulate zinc for pH affect on the coating composition, also may be determined indirectly, by trial preparation of a coating composition sample. In the indirect method, all coating composition components are blended together to prepare the coating composition sample. Following this, bath pH is measured and bath stability is observed for the composition sample, and undesirable bath gelation can call for assistance in harmonizing the pH affect of the components. Such harmonization of pH affect can be assisted or augmented, for example, by acidifying the coating composition during preparation. In this adjustment, the addition of chromic acid directly during component blending is preferred. However, the addition of other acidic substances is contemplated, e.g., molybdic acid and vanadic acid.

After preparation, the pre-paint coating composition is ready for application. Such may be applied to the metal substrate by any conventional method for coating a substrate with a liquid, for example, dip coating, roller coating, or reverse roller coat, curtain coating, airless spray, rotary brush coating, pressure spray and brush techniques. In any method, such application generally provides a pre-paint coating on the metal substrate supplying anywhere from about 20 to about 5,000 milligrams per square foot of coated substrate of the pulverulent zinc. Such amount can depend upon the substrate to be coated, the number of coatings to be applied, the end use contemplated and whether or not a topcoating is contemplated.

After application the pre-paint coating is cured, which can often be preceded simply by air drying at room temperature or by accelerated air drying at an elevated temperature such as 200°F or higher. Such curing, as by baking, provides for the water insoluble coating on the metal substrate. Baking at an elevated substrate temperature may be attained by pre-heating the metal prior to application of the pre-paint coating composition with, in any event, such curing temperatures not often exceeding temperature within a range of about 450°–1,000°F, although more moderate curing temperatures, e.g., 275°–325°F are contemplated especially if a topcoating is then applied that will be cured by baking at a temperature of about 450°F. or more. At the more elevated curing temperatures the heating can be carried out in a fraction of a second but it is generally conducted for slightly longer time, such as about 1 minute, at a more reduced temperature.

In general, although the nature of the topcoat to be applied over the pre-paint coating is very broad in contemplation, topcoatings of a special interest are those that contain finely divided pulverulent material. Of these topcoatings, although finely divided pigment and fillers are important, topcoatings of special importance for enhancing corrosion protection of the underlying substrate contain pulverulent metals such as pulverulent zinc. For example, it has already been shown in U.S. Pat. No. 3,671,331, that a primer topcoating containing a particulate, electrically conductive pigment, such as zinc, is highly serviceable for a metal substrate that is first treated with a bonding coat composition containing a pulverulent metal such as finely divided zinc, which zinc was supplied in a pre-paint coating from a composition containing hexavalent-chromium-providing substance, such as chromic acid, and a reducing agent for said substance.

Such topcoatings, which are representative of those that contain pulverulent metal, are often for convenience referred to as "weldable primers". These primers contain an electrically conductive pigment plus a binder in a vehicle. Thus, it has been disclosed in U.S. Pat. No. 3,110,691 that a suitable zinc base paint composition for application to a metallic surface prior to welding can be prepared where key ingredients include not only the particulate zinc but also a liquid vehicle including a resinous film forming binder such as epoxy resin. Likewise, U.S. Pat. No. 3,118,048 shows a coating composition, that may be applied prior to welding, and has as chief ingredients a solvent forming at least a portion of the liquid vehicle and further containing a synthetic resin film-forming, or binder, component, of which modified alkyd resins are exemplary. In general, the particulate electrically conductive pigments in the weldable primers are aluminum, copper, cadmium, steel, carbon, zinc or magnetite, i.e., the magnetic oxide of iron, and these primers of particular interest include such pigments of larger size than the particulate zinc in the pre-paint coating. Also, the binder components may include polystyrene, chlorinated or isomerized rubber, polyvinyl acetate and polyvinyl chloride-polyvinyl acetate copolymers, alkyd/melamine, and epoxy resin.

A topcoating formultion applicable to metal substrates, without weldability in mind, contains particulate zinc along with zinc oxide. Such paints are often formulated with a zinc dust to zinc oxide ratio of about 4:1, although such ratio may be as high as 9:1. Total pigment concentrations will vary considerably and are typically dependent upon the ratio of the zinc to the zinc oxide. Also, the ingredients in the topcoating formulation will typically be dependent upon the zinc to zinc oxide ratio. For example, where such ratio is 4:1 the vehicle usually employed is linseed oil or other oleoresinous medium. At ratios greater than 4 to 1, and with pigment concentrations ranging up to 90 to 95%, such compositions typically include polystyrene plasticized with chlorinated diphenyls.

Another topcoating system of special consideration has been referred to in the prior art, most ostensibly for convenience, as "silicate coatings". These appear to be aqueous systems that contain a finely divided metal such as powdered zinc or aluminum, lead, titanium or iron plus a water soluble or water dispersible binder. Representative of the binders are alkali metal silicates, an organic silicate ester, or a colloidal silica sol. Thus, U.S. Pat. No. 3,372,038 shows an aqueous coating system for providing corrosion resistance to metal substrates with a formulation containing a finely divided zinc powder plus an organic ammonium silicate. Although such silicate coatings are not typically employed before welding, U.S. Pat. No. 3,469,071 discloses arc-welding of a steel having a protective coating that may be derived from a coating composition containing inert silicate fillers, zinc powder and partially hydrolized esters of amphoteric metal binders, for example ethyl silicate. In U.S. Pat. No. 2,944,919 an aqueous based coating composition that contains a sodium silicate may further contain a finely divided metal in addition to zinc, such as magnesium, aluminum, manganese and titanium.

Although in the considerations for a topcoating over the pre-painted metal surface, such above discussed topcoatings are of special interest, the metal substrate can be further topcoated typically with any suitable paint, i.e., paint, primer, enamel, varnish or lacquer. Such paints may contain pigment in a binder or can be unpigmented as exemplified by cellulose lacquers, rosin varnishes, and oleoresinous varnishes. The paints can be solvent reduced or may be water reduced, e.g., latex or water soluble resins, including modified or soluble alkyds, or the paints can have reactive solvents such as in the polyesters or polyurethanes.

Particularly when the metal substrate to be coated is a weldable metal substrate, additional composite coating systems may be contemplated. For example, after the pre-paint coating composition of the present invention is applied to a weldable metal substrate, such substrate may be topcoated with a weldable primer and then, following welding, the resulting metal assembly is further topcoated. The weldable primers, and often the silicate primers, are formulated with subsequent topcoating of such primers being taken into consideration during formulation. Since at least the weldable primers typically contain an electrically conductive pigment, the topcoating may be an electrocoated primer.

The electrodeposition of film-forming materials is well known and can include electrocoating of simply a film-forming material in a bath where such a bath may contain one or more pigments, metallic particles, drying oils, dyes, extenders and the like. Representative film-forming systems of this nature are set forth, for example, in U.S. Pat. Nos. 3,304,250 and 3,455,805. Also, substances of particular interest, for example in the automotive industry, are the anodically deposited film-forming materials as exemplified by U.S. Pat. No. 3,230,162. Included in these composite coating systems there can be an electrophoretically deposited zinc paint. Such may be deposited, for example, on the pre-paint treated metal surface of the present invention and the deposited zinc paint provides intermediate coating for subsequent topcoating. In U.S. Pat. No. 3,464,906 a zinc paint that can be electrodeposited and contains water-soluble or dispersible resin as a binder in aqueous medium, is taught.

Reference has been made hereinbefore to welding and specifically to arc-welding. So long as the metal substrate is weldable, the pre-paint coating composition can be adapted to provide continued weldability in addition to corrosion resistance for the metal substrate. Thus a pre-paint coating composition of the present invention but formulated under considerations presented in U.S. Pat. No. 3,687,738 will provide for retention of weldability of the substrate. Furthermore, when reference is made herein to welding, the subsequent welding under consideration may be electrical resistance welding and such may be spot welding, i.e. localized electrical resistance welding, or seam welding such as with roller electrodes.

Before application of the pre-paint coating composition to a metal substrate it is generally advisable to remove foreign matter from the metal surface by thoroughly cleaning and degreasing. Degreasing can be accomplished with known agents such as sodium metasilicate, caustic soda, carbon tetrachloride, trichlorethylene and the like. The use of commercial alkaline cleaning compositions may be employed which combine washing and mild abrasive treatment, e.g., an aqueous trisodium phosphate-sodium hydroxide cleaning solution. In addition to cleaning, the substrate can undergo cleaning plus etching, for example, with a strong inorganic acid etching agent.

The following examples show ways in which the invention has been practiced but should not be construed as limiting the invention. In the examples, the following procedures have been employed.

PREPARATION OF TEST PANELS

Steel test panels, typically 4 inches × 8 inches, and all being cold rolled, low carbon steel panels are prepared for coating by first scrubbing with a cleaning pad which is a porous, fibrous pad of synthetic fiber impregnated with an abrasive. Thereafter, the scrubbed panels are immersed in a cleaning solution typically containing chlorinated hydrocarbon and maintained at about 180°F., or containing 1–5 ounces, per gallon of water, of a mixture of 25 weight percent tripotassium phosphate and 75 weight percent potassium hydroxide. This alkaline bath is maintained at a temperature of about 150°–180°F. Following the cleaning, the panels are rinsed with warm water and preferably dried.

PRIMER TOPCOATING and APPLICATION

When pre-painted panels are primer topcoated, the primer, initially, is a commercially available primer which is a zinc-rich weldable primer having at first a weight per gallon of 15.4 lbs., an initial solids volume of 30%, and containing initially 64 weight percent of nonvolatiles. The binder component is prepared from a high molecular weight epoxy resin. Prior to use, this primer is reduced to a viscosity of 45 seconds as measured on a No. 4 Ford cup with an aromatic solvent prepared synthetically from petroleum and having a flash point of 145°–150°F. This primer is applied to all of the pre-painted panels by drawing the primer down over the panel with a draw bar to provide a smooth, uniform primer coat on each of the pre-painted panels. Resulting coated panels are cured for 4 minutes in an oven at 550°F.

DRAW TEST (SHEAR ADHESION)

The adhesion of the coating system on the panel under shearing force is then measured in the draw test. In this test the panel is first oiled on both sides of the panel with a light oil. The panel is then drawn through the draw test; next it is pressed to return the panel to its original shape, and finally the panel, without further oiling, is subjected again to the draw test. After removal from the second draw, the panel is wiped clean and is then visually inspected to determine the percentage of the exposed bare metal, or alternatively, of the coating system retained on the panel.

In this inspection, panels are compared one with the other, and the percent retention is generally estimated simply after visual inspection, although, the panels may be subsequently soaked for 10 seconds in copper sulphate solution, containing 160 grams of copper sulphate per liter of water. This facilitates the visual determination of what percentage of the panel is left uncovered owing to the copper sulphate plating on the base steel, but not on burnished zinc. That is, the copper from the copper sulphate will not plate on the coating where the zinc has been polished by scraping but not removed to bare steel. The passage of the panel twice through the draw test is found from experience to better correlate results for coating adhesion under shear force with such results as would be observed in industry. For example, in the automotive industry as has been mentioned hereinbefore, primer coated panels often proceed through as many as five or more operations, including drawing, pressing, trimming, punching and bending.

In the draw test, more specifically, there is used a Tinius Olsen Ductomatic Sheet Metal Tester, Model BP-612-N. This machine is commonly used in the steel industry for determining the ductility of steel panels. In general, an about 1.75 inches × 12 inches steel panel is held firmly between male and female dies, each having a central aperture, to permit a metal ram to move upwardly through the dies for a pre-selected distance. The ram forces the panel upwardly in the aperture of the male die, resulting in the pulling and stretching of part of the panel through a portion of the mating surface of the dies. More particularly, the female die, measuring approximately 3.5 inches × 6 inches × 0.75 inches is placed so that its central aperture of about 2 inches × 1 inch, is located directly over the ram.

The panel for testing is then placed flat across the female die so that a portion of the panel projects out from one die edge. The male die, of essentially similar dimensions to the female die, is then placed on top of the test panel; its central aperture is positioned over the metal ram. The female die on its upper surface contains two projecting ridges across the width of the die, one on each side of the aperture, and having an inverse U-shape. The lower face of the male die is machined to have two U-shaped grooves, each about 0.25 inch deep, one on each side of the aperture, and across the width of the undersurface. The ridges provide a snug fit into the corresponding grooves, thereby enhancing the firm grip for the dies on the test panel. Also, one groove/ridge configuration provides two bearing, i.e. scraping, surfaces during the test, as discussed further hereinbelow.

At each corner, the female die has a pin extending upwardly for mating with a coresponding aperture in the male die. These pins are for maintaining stability of the dies during the test and are not in contact with the test panel. After the male die is in place, a hinged breach is pulled down on top of the male die and locked. The portion of the test panel projecting out from the dies is clamped. By such action, the clamping of approximately one-half of the panel is more firmly established; thus, during testing only about the other half of the panel will be free to move and be drawn during the test. After clamping, the instrument clamp load is set at 3,000 lbs., the rate of draw dial provided on the instrument is set at 10, and the ram is permitted to move upwardly for a distance of about 2.5 inches. During this movement, about the first half-inch of ram movement is necessitated to move the rounded-dome ram into contact with the panel and the remaining about 2 inches of movement actually draws half of the panel through the mated die surfaces.

In typical operation for an 0.036-inch steel, the ram is moved upwardly at a force of about 2,500–4,000 lbs. The half-portion of the panel tested is drawn across three bearing surfaces. Two of these are provided by the edges of the groove in the groove/ridge configurations. The third bearing surface is the edge of the male aperture parallel and closest to the groove providing the other two bearing surfaces. The panel portion thus actually subjected to the test typically measures about 1¾ inches × 2.5 inches. With the above mentioned .036-inch steel, this section will often exhibit an about 20–25% total metal extension, beyond its original test length, after the second draw. After such draw, the general configuration of the panel shows a U-shaped central portion that has been pushed upwardly about 2 inches from the original flat surface.

CORROSION RESISTANCE TEST

Panels are subjected to the corrosion resistance test by means of the standard salt spray (fog) test for paint and varnishes as described in ASTM B-117-64. In this test, panels are placed in a chamber held at constant temperature where they are exposed to a fine spray (fog) of a 5% salt solution for a period of time as noted in the examples. Upon removal from the chamber the panels are rinsed in water and then dried. The extent of corrosion, i.e., red rust, on the test panels is determined by visual inspection through comparison of panels one with the other.

EXAMPLE 1

There is formulated, with blending, a precursor constituent containing 20 grams per liter of chromic acid, 3.33 grams per liter of succinic acid, 1.67 grams per liter of succinimide, 1.5 grams per liter of xanthan gum hydrophilic colloid, which is a heteropolysaccharide prepared from the bacteria specie *Xanthamonas campestris* and has a molecular weight in excess of 200,000. Additionally, this precursor composition contains 1 milliliter of formalin, 8.4 grams per liter of zinc oxide, and 1 drop per liter of a wetter which is a nonionic, modified polyethoxide adduct having the viscosity in centipoises at 25°C of 180 and a density of 25°C of 8.7 lbs. per gallon. This precursor constituent has a pH of 3.65. It is placed in an air tight container and stored.

For control purposes, there is subsequently blended together a separate control solution that will provide a final control coating composition containing, in water, 20 grams per liter of chromic acid, 3.33 grams per liter of succinic acid, and 1.67 grams per liter of succinimide along with sufficient zinc oxide to provide this control solution with a pH of 3.3. Along with this preparation, and also for control purposes, there is separately prepared, in water, a control formulation so that it will provide a final control coating composition containing 1.5 grams per liter of the above identified heteropolysaccharide, 1 millileter of formalin, and one drop per liter of the above identified wetter.

This control formulation containing the heteropolysaccharide is then blended with the control solution containing the chromic acid. There is further admixed with the resulting blend a commercially available "L-15" zinc dust manufactured by the American Smelting and Refining Co. The zinc dust is admixed at a concentration of 150 grams per liter for the final control coating composition. This dust has an average particle size of 5.1 microns, a maximum particle size of about 26 microns with about 11% of the particles having size greater than 10 microns. Further, this zinc dust has an oxide content of about 2.9% zinc oxide. Blending then provides a uniform pre-paint coating formulation, i.e. the final control coating composition, and the formulation is tested and found to have a pH of 5.3. For purposes of convenience, this formulation is identified as the "Control".

The chromic acid plus heteropolysaccharide formulation, detailed first in this example, and which has been stored, is removed from storage after 80 days. It is likewise blended with the above identified zinc dust at a concentration level of 150 grams per liter of the zinc dust. After such blending to achieve a uniform pre-paint coating composition, the pH of this composition is checked and is also found to be 5.3. For purposes of convenience, this coating composition is referred to as the "Simplified" composition.

Panels, prepared as described hereinabove, are dip coated, some into freshly prepared Control coating composition and some into the coating composition prepared from the 80-day old precursor. Panels are removed from these compositions and excess composition is drained from the panels. They are then baked for 4.5 minutes in an oven at a temperature of 550°F.

Coating weights for panels coated with both the Control and the Simplified composition are presented in the table below. Panels are then topcoated with a primer, and in the manner, described hereinbefore. Some of these panels are then selected for testing in the above described corrosion resistance (salt spray) test and other panels are tested in the above detailed draw test. Although panels in the salt spray test are bent before testing, the results reported in the table are for the face of the panel only and not the bend, as such results at the bend essentially parallel those reported on the face. The results of such testing for these panels is presented in the table below.

TABLE 1

| Pre-paint Coating | Pre-Paint Coating Weight* | | Draw Test % Coating Retained** | Salt Spray % Corrosion Face |
|---|---|---|---|---|
| | Cr | Zinc | | |
| Control | 47 | 510 | 69 | 1–2 |

TABLE 1-continued

| Pre-paint Coating | Pre-Paint Coating Weight* | | Draw Test % Coating Retained** | Salt Spray % Corrosion Face |
|---|---|---|---|---|
| | Cr | Zinc | | |
| Simplified | 48 | 550 | 93 | Tr*** |

*In milligrams per square foot.
**Average of two panels.
***Tr = Trace.

In the results listed in the above table it can be seen that the panels coated with the freshly prepared Control prepaint coating composition, which are subsequently topcoated with the primer, exhibited desirable corrosion protection. In evaluating the corrosion resistance results it must be kept in mind that the control composition contains the lower coating weight of the particulate zinc. Thus, these results are not presented to especially highlight a surprising superiority in the corrosion resistance test for the simplified pre-paint coating composition, i.e., the composition prepared from a precursor constituent that had been shelved for 80 days. Rather, these are presented more to demonstrate the capability of maintaining desirable corrosion resistance results, as achieved by coatings from the Control coating composition. It is, however, noteworthy that in the draw test results, and even with the heavier pre-paint coating weight, the coating from the simplified composition representative of the present invention displays excellent draw results. Such coating is thereby readily judged to be the superior coating despite the storage of the precursor constituent for 80 days prior to preparation of the pre-paint coating composition.

EXAMPLE 2

A set of three precursor constituent components are prepared as first described in Example 1, except that varying amounts of zinc oxide are used to prepare components of differing pH. The pH for each of these constituents is shown in the table below. The zinc component used with each constituent is an L-10 zinc dust manufactured by American Smelting & Refining Co. This zinc dust has a median particle size of about 2.8 microns, and has an oxide content of 4%. It is blended in to each component to provide 150 g./l. of this dust in resulting coating compositions. The resulting composition pH and gelation datum, for each resulting composition in unstirred condition are all presented in Table 2 hereinbelow.

Table 2

| Precursor Component | Precursor pH | Coating Composition pH | Coating Composition Gelation |
|---|---|---|---|
| Component I | 3 | 5.5 | > 46 Hours |
| Component II | 4 | 5.65 | 2–2.5 Hours |
| Component III | 5 | 5.85 | 1 Hour |

A comparative system is prepared in the manner of Component I, except that the zinc oxide is not added to the precursor constituent. Subsequently, a comparative coating composition is prepared as above described from this comparative system, and then the zinc oxide is added to adjust the coating composition pH to 5.5. Such comparative coating composition gels in at least 18 hours.

An additional precursor constituent component was prepared as above discussed, but the pH was adjusted using calcium carbonate in place of zinc oxide. This preparation, plus subsequent coating composition preparation in the manner above described, discloses such carbonate to be highly suitable as a pH adjustment agent.

EXAMPLE 3

A precursor constituent component is prepared as first described in Example 1. Sufficient zinc oxide is used in preparation to provide a component pH of 4.8. A zinc component is then added to the precursor constituent, as described hereinbefore, but to attribute only 50 g./l. of the above described L-10 zinc dust to the coating composition. This particular lot of zinc dust contains 3.5 weight percent of zinc oxide. The resulting coating composition is thus at a pH of 5.5 and exhibits freedom from deleterious, irreversible gelation, for more than 72 hours.

I claim:

1. The method of preparing a pulverulent-zinc-containing coating composition, having enhanced compositional stability at a pH below about 5.6 and above about 4.5, which composition is adapted for treating metal substrates and providing corrosion resistance thereto, wherein said coating composition is prepared to contain hexavalent chromium from a pulverulent-zinc-free chromic acid component (A), and to further contain zinc from a pulverulent zinc component (B), which method comprises:
   1. preparing said chromic acid component (A) at a pH of from 3 to below about 5 and with reduced forms of chromium, if such exist, being substantially below 5 percent of the component hexavalent chromium, by:
      a. establishing an aqueous composition containing chromic acid in solution, said chromic acid being present in amount sufficient to provide for a pH in water of below 3.0;
      b. adjusting the pH of said aqueous composition to from 3 to about 5, inclusive, with basic, compatible and acid soluble pH adjustment agent, wherein compatibility of said pH adjustment agent provides cured coatings from said coating composition of enhanced water insolubility; and,
      c. admixing xanthan gum hydrophilic colloid to the composition of adjusted pH and after said pH adjustment, for preparing the chromic acid component (A);
   2. preparing said pulverulent zinc component (B) to contain zinc in an amount sufficient to supply above about 50 grams per liter of pulverulent zinc to said coating composition; and
   3. blending components together to prepare said coating composition of enhanced stability at a pH of below about 5.6 and above about 4.5.

2. The method of claim 1 wherein said aqueous composition is adjusted by blending with a pH adjustment agent selected from the group consisting of lithium oxide, lithium hydroxide, the metal oxides or hydroxides of the metals in Group IIA or groups above IIA which are soluble in aqueous chromic acid solution, the compatible carbonates of all of the foregoing metals that have said chromic acid solubility, and mixtures thereof.

3. The method of claim 1 further characterized by preparing said chromic acid component (A) to contain reducing agent for the hexavalent chromium provided by said chromic acid while maintaining reduced forms of chromium, if such exist, at substantially below 5 percent of said component hexavalent chromium.

4. The method of claim 3 further characterized by preparing said chromic acid component (A) to contain succinic acid or a $C_5$–$C_{14}$, inclusive, dicarboxylic acid or mixtures thereof.

5. The method of preparing a corrosion resistant coated metal substrate having an adherent coating from a pulverulent-zinc-containing coating composition exhibiting enhanced compositional stability at a pH below about 5.6 and above about 4.5, which composition is adapted for treating metal substrates and providing corrosion resistance thereto, and is prepared to contain hexavalent chromium from a pulverulent-zinc-free chromic acid component (A), and to further contain zinc from a pulverulent zinc component (B), which method comprises:
   I. formulating the coating composition of enhanced stability by:
      1. preparing said chromic acid component (A) at a pH of from 3 to below about 5 and with reduced forms of chromium, if such exist, being substantially below 5 percent of the component hexavalent chromium, by:
         a. establishing an aqueous composition containing chromic acid in solution, said chromic acid being present in amount sufficient to provide for a pH in water of below 3.0;
         b. adjusting the pH of said aqueous composition to from 3 to about 5, inclusive, with basic, compatible and acid soluble pH adjustment agent, wherein compatibility of said pH adjustment agent provides cured coatings from said coating composition of enhanced water insolubility; and,
         c. admixing xanthan gum hydrophilic colloid to the composition of adjusted pH and after said pH adjustment, for preparing the chromic acid component (A);
      2. preparing said pulverulent zinc component (B) to contain zinc in an amount sufficient to supply above about 50 grams per liter of pulverulent zinc to said coating composition; and
      3. blending components together to prepare said coating composition of enhanced stability at a pH of below about 5.6 and above about 4.5; and thereinafter
   II. applying the resulting coating composition to a metal substrate; and
   III. permitting evaporation of volatile coating substituents thereby obtaining an adherent and corrosion resistant coating on said metal substrate.

6. The method of claim 5 wherein said volatile coating substituents are at least in part volatilized by heating applied coating composition.

7. The method of claim 5 further characterized by applying over said adherent coating a paint topcoating containing particulate metal.

8. A coated metal substrate prepared according to the method of claim 5.

9. In the method of preparing a puverulent-zinc-containing coating composition, which composition has enhanced compositional stability at a pH below about 5.6 and above about 4.5, and which composition is adapted for treating metal substrates and providing corrosion resistance thereto, wherein said coating composition is prepared to contain hexavalent chromium from a pulverulent-zinc-free chromic acid component, and to further contain zinc from a pulverulent zinc component, the improvement in the method of preparation which comprises: preparing said chromic acid component at a pH of from 3 to below about 5 and with reduced forms of chromium, if such exist, being substantially below 5 percent of the component hexavalent chromium, by:

a. establishing an aqueous composition containing chromic acid in solution, said chromic acid being present in amount sufficient to provide for a pH in water of below 3.0;

b. adjusting the pH of said aqueous composition to from 3 to about 5, inclusive, with basic, compatible and acid soluble pH adjustment agent, wherein compatibility of said pH adjustment agent provides cured coatings from said coating composition of enhanced water insolubility; and, c. admixing xanthan gum hydrophilic colloid to the composition of adjusted pH and after said pH adjustment, thereby preparing said chromic acid component.

10. The method of claim 9 further characterized by establishing said aqueous medium to further contain reducing agent for the hexavalent chromium provided by said chromic acid.

* * * * *